No. 824,530. PATENTED JUNE 26, 1906.
F. N. DONALDSON.
CASING SPEAR.
APPLICATION FILED MAR. 18, 1905.
3 SHEETS—SHEET 3.
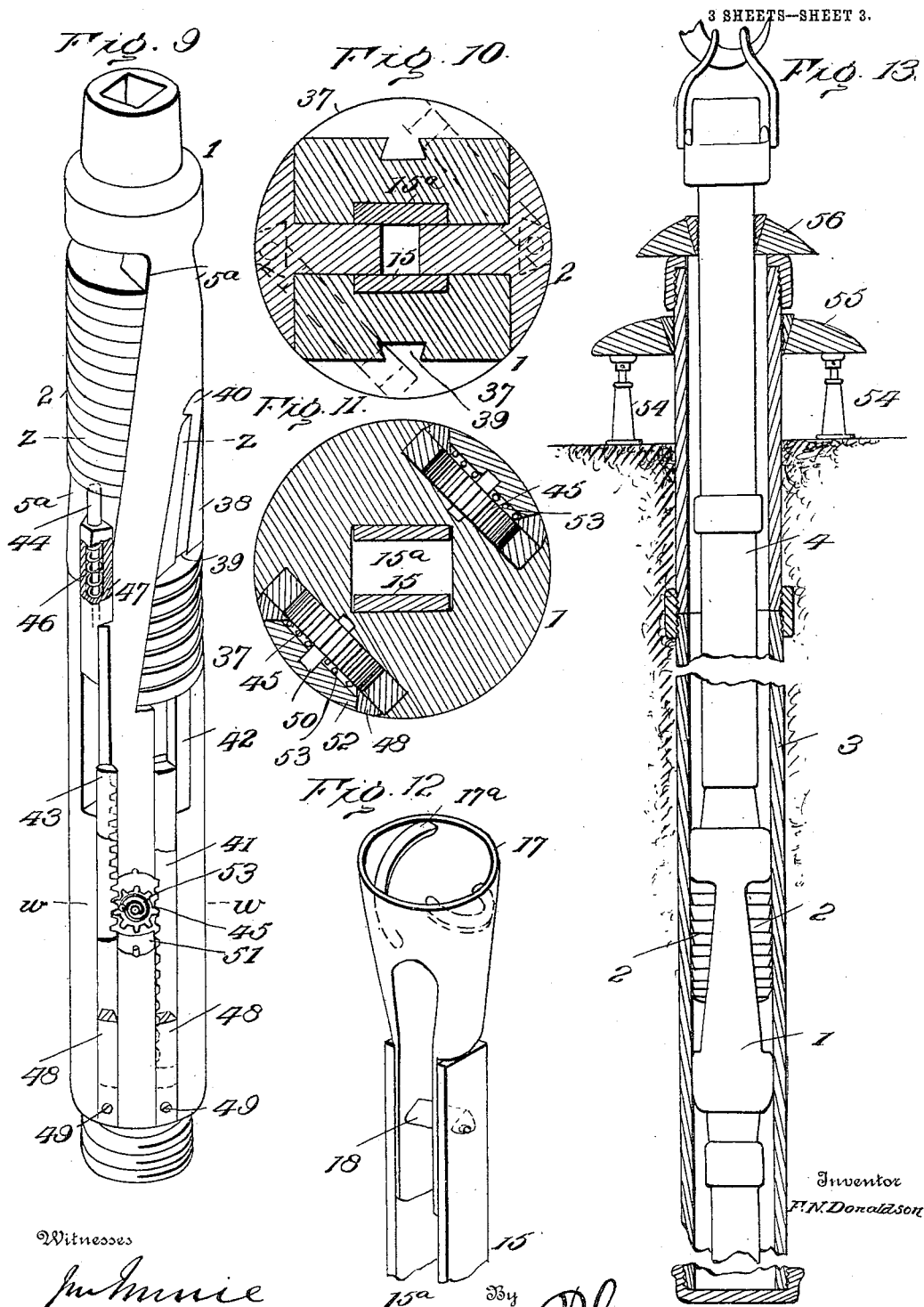

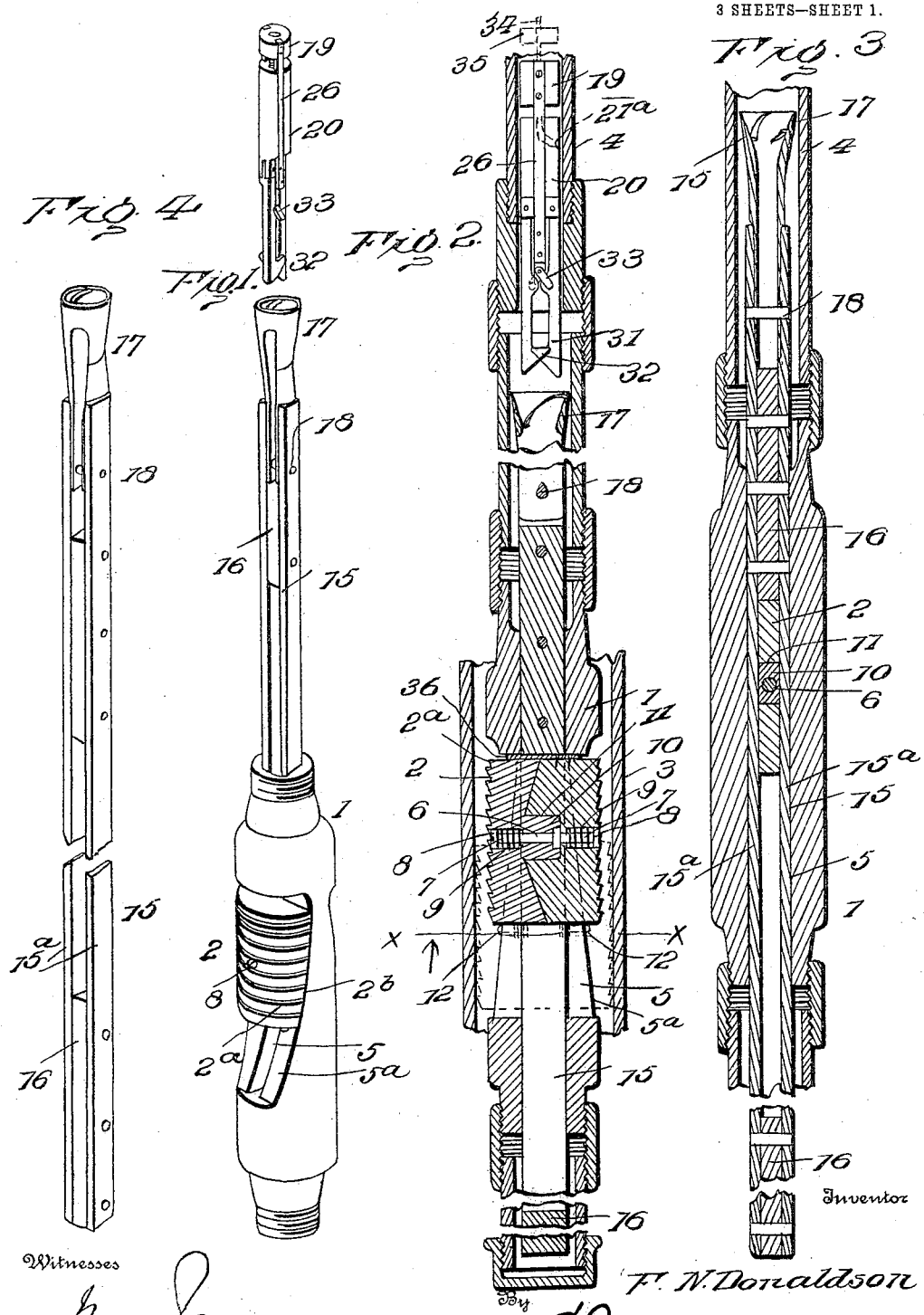

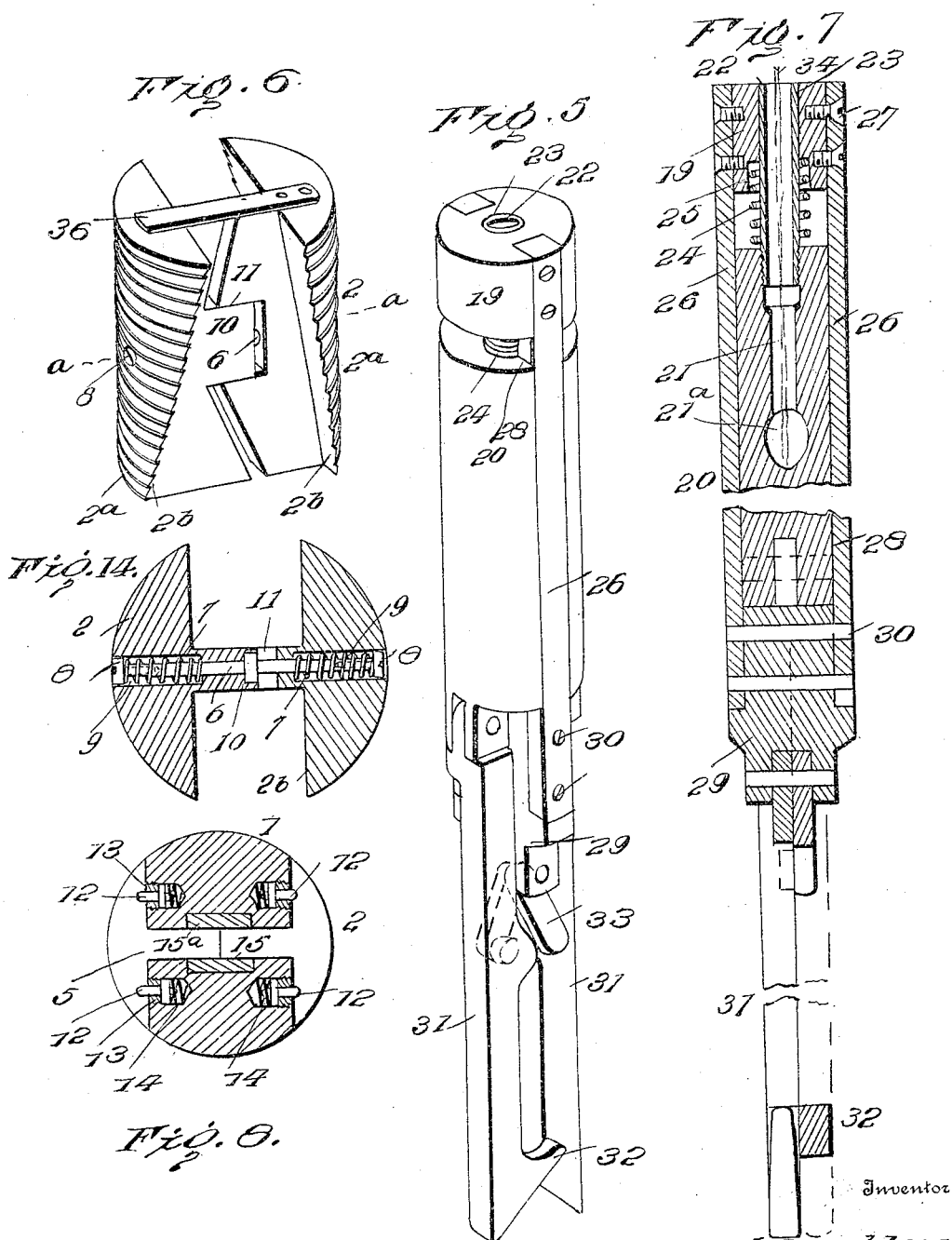

UNITED STATES PATENT OFFICE.

FRANK N. DONALDSON, OF JEWETT, OHIO.

CASING-SPEAR.

No. 824,530.   Specification of Letters Patent.   Patented June 26, 1906.

Application filed March 18, 1905. Serial No. 250,945.

*To all whom it may concern:*

Be it known that I, FRANK N. DONALDSON, a citizen of the United States, residing at Jewett, in the county of Harrison and State of Ohio, have invented certain new and useful Improvements in Casing-Spears, of which the following is a specification.

This invention relates to that class of devices commonly employed in oil, Artesian, and other wells for elevating tubular bodies, casings, or the like and commonly called "casing-spears."

The invention embodies a novel construction of spear of the type comprising, primarily, a suitable body and slips mounted upon the body for engagement with the casing for removal of the same.

The primary object of the invention is to secure a device of this class of a special advantageous construction which admits of a full control of the device by the operator in the practical use thereof.

The invention includes special means enabling the operator to positively actuate the slips carried by the body of the spear in engaging and disengaging these parts with relation to the casing which is being operated upon; and, further, the invention utilizes peculiar grappling means in connection with the spear for effecting the purposes of the invention.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a spear embodying the essential features of the invention. Fig. 2 is a vertical sectional view of the spear in a well-casing, showing the grappling device in operative position. Fig. 3 is a sectional view of the spear alone and taken about at a right angle to Fig. 2. Fig. 4 is a detail view of the actuating member mounted in the body of the spear for controlling the operation of the slips. Fig. 5 is a perspective view of the grappling device coöperating with the spear for operating the slips. Fig. 6 is a perspective view of the slips alone and arranged in operative position with relation to each other, slightly expanded or separated. Fig. 7 is a vertical sectional view through the grappling device, bringing out more clearly the arrangement of the parts thereof. Fig. 8 is a transverse sectional view about on the line $x\,x$ of Fig. 2. Fig. 9 is a perspective view of a modification. Fig. 10 is a transverse section on the line $z\,z$ of Fig. 9, showing the parts on a larger scale. Fig. 11 is a horizontal section on the line $w\,w$ of Fig. 9, showing the parts on a larger scale. Fig. 12 is a detail perspective view of the upper end of the hammer-bar. Fig. 13 is a vertical section of a well, showing the combined application of the spear and jacks for pulling the casing. Fig. 14 is a section on the line $a\,a$ of Fig. 6, showing the parts on a larger scale.

Corresponding and like parts are referred to in the following description and indicated in all the views of the drawings by the same reference characters.

Generally describing the same, the invention contemplates, broadly, the provision of the spear consisting of a body 1, upon which the slips 2 are arranged and actuating means carried by the body positively coöperating with the slips to effect movement thereof either to raise or lower the same, so as to thereby enable the operator of the device to thoroughly control the same to an extent not heretofore attained in this art. The body or barrel 1 is of tubular or hollow formation throughout its length and may be raised and lowered in the casing 3 of the well in any accustomed way, as by means of piping 4, connected therewith. The piping 4 is illustrated as the means for moving the spear within the casing 3, said piping 4 extending from the upper extremity of the body or barrel 1 in the customary manner. The body 1 of the spear it transversely slotted at a point between its ends, as shown at 5, the slips 2 being mounted at the portions 5 aforesaid. The slips 2 in exterior appearance are similar to those at present in use and are two in number, being provided upon their exterior portions with toothed or serrated surfaces, (indicated at $2^a$,) admitting of positive engagement of the slips with the casing in order to pull or extract the same. The slips 2 are adapted for separation in order to effect engagement thereof with the casing 3 and are connected flexibly by means of a rod 6, having springs 7 mounted upon the ends thereof, The springs 7 are interposed between the heads of screws 8, screwed into the ends of the rods 6 and the body portions of the slips aforesaid. In other words, each spring 7 bears at its outer end against the head of a screw 8, and the inner end of the spring bears against the slip 2, each spring being mounted in recessed portions 9 in each slip. The normal tendency of the springs 7 is to hold the slips 2 together, and the said slips are interlocked in order that the same will be moved simultaneously in effecting the engaging and disengaging action thereof as regards the casing 3. An extension 10 projects from one slip 2 and engages in a recess 11 in an adjacent slip, affording the interlocking means above mentioned. The slotted portion 5 of the body of the spear is some distance longer than the length of the slips 2, so that the slips are adapted for a certain amount of sliding or longitudinal movement upon the body 1. The interlocking portions of the slips 2 operate in the tubular portion of the body 1, and the outer portion of each slip is wider than the interlocking portion. The body 1 of the spear is inclined at opposite sides throughout the length of the slotted portion 5, as indicated at 5ᵃ, and the slips 2 are adapted to operate lengthwise of the inclined portions 5ᵃ. The portions 5ᵃ of the body or barrel 1 incline outwardly toward the lower extremity of the slotted portion 5, so that when the slips 2 are actuated from their normal positions adjacent the upper extremity of the slot 5 and forced downwardly toward the lower extremity of said slot the inclination of the side portions of the barrel 1 will effect spreading movement of the slips, so that the same will be caused to positively engage the casing 3. The slips 2 are normally held at the upper portion of the slot 5 by spring-actuated pins 12, mounted upon the body 1, said pins 12 being held in place by plugs 13. The pins 12 are normally projected from the body 1 by means of springs 14, and the outer extremities of the pins engage beneath respective slips 2 to hold the slips elevated or at the upper extremity of the slot 5 in such a manner that said slips do not engage the casing 3.

Within the body 1 of the spear is a hammer-bar 15, adapted to coöperate with the slips 2 to effect slidable movement thereof upon the body 1 to expand or contract the same or cause them to move downward or upward. The hammer-bar comprises spaced bars 15ᵃ, having drivers or weights 16 at the upper and lower ends thereof. The drivers or weights 16 are disposed above and below the slips 2, and the distance between the weights 16 is sufficient to admit of a certain amount of slidable movement of the member 15 within the body 1 of the spear and with relation to the slips 2. The hammer-bar 15 is adapted to be raised and lowered so as to bring either the upper or lower drivers or weights 16 into contact with either the upper or the lower extremities of the slips 2, respectively, in order to effect slidable movement of the slips upon the body 1. In causing the slips 2 to engage the casing 3 after the spear has been lowered into the casing the requisite distance the member 15 is raised and dropped, so as to cause the upper weight 16 to engage the upper extremities of the slips 2, whereupon the slips 2 are forced downwardly along the inclined ways or portions 5ᵃ of the body 1, such movement causing expansion of or separating the slips for positive engagement thereof with the interior of the casing 3. When the slips 2 are forced downwardly, the pins 12 are moved inwardly, the tension of the springs 14 being overcome. In order that the slips 2 may force the pins 12 inwardly, the lower ends of the slips, which are normally engaged by the outer extremities of the pins 12, are beveled, as indicated at 2ᵇ, for obvious reasons. To disengage the slips 2 from the casing 3, it is only necessary to pull the actuating member 15 upwardly to cause the lower weight 16 to come into contact with the lower extremities of the slips, whereupon the latter will be forced to the upper end of the slot 5, and the flexible connection between the slips causes the same to be forced together, and thus disengaged from the casing 3.

The means for raising and lowering the hammer-bar 15 is of a peculiar nature and comprises, essentially, a grappling device adapted to be engaged with or disengaged from the member 15 in operating the latter. The upper extremity of the member 15 is provided with a funnel-shaped head 17 inside and attached to which is two one-half-spiral guides 17ᵃ, located opposite to each other, and a short distance below this head is located a bar 18, connecting the spaced bars 15ᵃ of the hammer-bar. The grappling device comprises a body composed of an upper section 19 and a lower section 20, the upper section being spaced some distance from the lower section under normal conditions. A longitudinal bore or opening 21 extends from the upper extremity of the section 20 a short distance into the same, thence extending laterally to the outer portion of the section, as indicated at 21ᵃ. The upper end of the bore 21 is threaded, and a tube 22 is screwed into the threaded portion, said tube projecting some distance above the section 20 and into a central opening 23 in the section 19. The sections 19 and 20 of the grappling device are movable with reference to each other, and the tube 22 forms a guide member to direct the relative movements of the said sections, and at the same time the said tube forms a support for a coil-spring 24, disposed thereabout and interposed between the sections 20 and 19, the said spring 24 extending at its upper end into an enlarged portion 25 at the lower end of the opening 23. The spring 24 normally holds the sections 19 and 20 apart. Attached to the sides of the section 19 are rods 26, secured thereto by the means of machine-screws 27 or the like, and these rods project downwardly from the section 19 alongside the section 20, extending to a point beyond the lower end of said section 20. The section 20 is provided with longitudinal recesses 28 in its sides, and said recesses receive the rods 26, so that the outer surfaces of the rods are normally flush with the outer surfaces of the section 20. The rods 26 are connected at their lower extremities by a member 29, secured thereto by transverse fastenings 30. Engaging dogs 31 are pivoted at their upper extremities to the section 20, and the lower extremities of said dogs are formed with hooks 32, adapted to engage the member 18 of the actuating device 15. The dogs 31 are spaced and are adapted for a certain amount of pivotal movement toward and from each other in order to be engaged with and disengaged from the bar 18, and said dogs 31 are operated by relative movement of the sections 19 and 20. The member 29, which connects the lower extremities of the rods 26, has a toggle connection with each of the dogs 31, the toggle members being indicated at 33, so that the longitudinal movement of the rods 26 will force the dogs 31 apart, the connection 29 operating between said dogs. The grappling device above described is adapted to be raised and lowered in the piping 4, if such is used, or within the casing 3 under other conditions, this grappling device having a cable or rope 34 connected therewith. The connection 34 passes through the opening 23 in the section 19 downward through the tube 22 into the bore 21 and is suitably secured at the lateral terminal of the said bore 21.

The operation of the grappling device with relation to the member 15 is as follows: In order to engage the dogs 31 with the member 15, the grappling device is lowered into the casing in the piping 4 in the construction illustrated, and when the hooks 32 come into contact with the bar 18 said hooks separate and then receive the bar therebetween in an obvious manner. The hammer-bar 15 may now be raised or lowered in order to effect actuation of the slips 2 in a manner which has been before described. Should it be necessary at any time to disengage the grappling device from the member 15, a weight 35 (shown in dotted lines in the drawings) is dropped into the well, so as to fall upon the section 19 of the grappling device, and this weight is sufficient to overcome the tension of the spring 24, so that the upper section 19 will move into contact with or down upon the section 20. Such movement of the section 19 will cause the rods 26 to move down also and the toggle members 33, connecting the rods 26 with the dogs 31, will be actuated so as to spread the hooks 32, whereupon the grappling device will be readily elevated, having been disengaged from the member 18 of the actuating hammer-bar in the body 1 of the spear.

The inwardly-extended webs of the slips 2 have the space formed between their inner edges closed at its upper end by means of a strip 36, which is of light metal and attached at one end to one of the slips and bearing loosely upon the other slip. This strip 36 forms a closure and prevents any foreign matter entering the space between the members from above and preventing their coming together when it is required to have the slips release their grip upon the casing.

In the modification shown in Figs. 9, 10, and 11 the spear or casing grapple is provided with a lower set of slips 37, which operate in an opposite direction to the slips 2 to prevent the spear or grappling device from falling to the bottom of the well in the event of the pulling-pipe parting at a point above the spear. The slips 37, two in number, are arranged at a right angle to the slips 2 and are moved outward into contact with the sides of the casing when pressed upward and release their grip upon the casing upon descending with reference to the body 1 of the spear or grappling device. The sides of the body 1 are cut away at diametrically opposite points to form inclines 38, upon which the slips 37 are slidably mounted, said slips being held in place by means of dovetailed ribs or lugs 39 and corresponding grooves or ways 40. The inclines 38 are upwardly diverged, hence extend in an opposite direction to the inclines 5ᵃ, which are upwardly converged. When the slips 37 move upward on the inclines 38, they receive a corresponding outward movement, which brings them in contact with the sides of the casing. The slips 37 support the spear or grappling device within the casing, thereby enabling the spear to be loosened and reset at a new position within the casing without requiring its withdrawal at each operation. The following means have been devised for positively operating the slips 37: A bar 41 is slidably mounted in a guide-groove of the body 1 and is provided at its upper end with a tappet 42, arranged in the path of the proximal slip 37. A companion bar 43 is similarly mounted in a guide-groove in the body 1 and is provided with a tappet 44, arranged in the path of the proximal slip 2. The pinion 45, fixedly mounted in the body at one side, has its teeth in mesh with cog-teeth formed along the adjacent sides of the bars 41 and 43, whereby movement imparted to one of the bars, as 43, is transmitted to the other bar 41 in reverse direction—that is, as the bar 43 descends the bar 41 correspondingly ascends. As a result of this motion, downward movement of the slip 2 effects a corresponding upward movement of the cooperating slip 37. The tappet 44 is yieldably connected with the bar 43, whereby provision is had for a varying movement of cooperating slips 2 and 37. This is accomplished by interposing a spring 46 between the tappet 44 and bar 43, the movement imparted to the tappet 44 being transmitted through the spring 46 to the bar 43, and should the slips 37 take hold of the casing before the slips 2 are forced home the springs 46 are compressed and the further downward movement of the slips 2 made necessary to cause them to take firm hold of the casing. A box 47 is connected to the upper end of the bar 43 and receives the spring 46 and has the lower portion of the tappet 44 telescoping therewith. The spring 46 surrounds the lower portion of the tappet 44 and is confined between a shoulder or stop thereof and the lower end of the box. The guide-grooves in which the bars 41 and 43 operate are closed by plates 48, slid into place from below and prevented from displacement by suitable fastenings 49. The pinion 45 is mounted upon a stud or pin 50, forming a part of the body 1 or set therein, said pinion being located in a recess 51, which is closed by means of a plate 52, the latter receiving the projecting end of the pin 50. A coil-spring 53, cooperating with the pinion 45, has one end secured to said pinion and the other end attached to the cover-plate 52, said spring serving to return the bars 41 and 43 to normal position when relieved of the influence or pressure of the slips 2. When the spear or grappling device is lowered into position in the casing and is made fast by driving the slips 2 downward in the manner herein stated, said slips coming in contact with the tappets 44 cause the bars 43 to move downward and the bars 41 to correspondingly move upward, with the result that the slips 37 are caused to ride upward on the inclines 38 and are pressed into contact with the sides of the casing. Should the pulling-pipe part at a point above the spear or grappling device, the latter is prevented from falling to the bottom of the well by the action of the slips 37. When it is required to shift the position of the spear or grappling device, the latter is pressed downward and the hammer-bar operated to drive the slips 2 upward, after which an upward pull upon the spear will cause the slips 37 to move forward on the inclines 38, and thereby release their hold upon the casing, when the spear may be adjusted to the required position in the casing and again set without necessitating removal of the spear from the well to reset the safety-slips.

Fig. 13 shows an arrangement whereby the spear or grapple may be used in conjunction with jacks 54 for withdrawing or pulling the casing. In this construction a casing-ring 55 is shown applied to the upper end of the casing 3, and a casing-ring 56 is shown applied to the upper portion of the pipe 4 and resting upon the casing. The jacks 54, which may be operated by hydraulic power or in any manner, exert an upward pressure upon the casing-ring 55, and through the casing-ring 56 said power is transmitted to the pipe 4 and from thence to the casing at a point in its length by means of the casing spear or grapple. By applying the power in this manner the strain is equalized upon the joints between the sections comprising the casing 3 and pipe 4, whereby they are less liable to part when pulling the casing. Moreover, through the pulling-pipe and grapple the lifting force is applied to the casing at or near its lower end, thereby relieving the upper joints of strain and equalizing the load on all the joints.

Having thus described the invention, what is claimed as new is—

1. In a casing-spear, the combination of a hollow body, slips mounted thereon and having portions passed through the body, interlocked and freely operable therein, and means other than the body for actuating the slips.

2. In a casing-spear, the combination of a hollow body, slips mounted thereon and having portions passed through the body and interlocked, and means operating within the body for positively actuating the slips.

3. In a casing-spear, the combination of a hollow body, slips mounted thereon and having portions passed through the body and interlocked, and means other than the body for positively actuating the slips in both directions.

4. In a casing-spear, the combination of a hollow body, slips mounted thereon and having portions passed through the body and interlocked, and means movable longitudinally within the body and adapted for coöperation with said slips to effect positive movement thereof either upon the upstroke or the downstroke of said movable means.

5. In a casing-spear, the combination of a hollow body, slips mounted thereon and having portions passed transversely through the body and interlocked, and means longitudinally movable with respect to the body and having portions extended across the path of the interlocked portions of the slips to positively actuate the latter in both directions.

6. In a casing-spear, the combination of a hollow body, slips mounted thereon and having portions passed transversely through said body and interlocked, and means longitudinally movable within the body and having portions extended upon opposite sides of the interlocked portions of said slips and joined above and below the latter to make positive engagement therewith for actuating the slips in either direction.

7. In a casing-spear, the combination of a hollow body, slips mounted thereon, and movable weights within the body for actuating the slips.

8. In a casing-spear, the combination of a hollow body, slips mounted thereon, and weights in said body and operating at opposite ends of the slips for actuation thereof.

9. In a casing-spear, the combination of a hollow body, slips mounted thereon, a member movably mounted within the body, and weights carried by the movable member and operating at opposite ends of the slips as specified.

10. In a casing-spear, the combination of a hollow body, slips mounted thereon, and actuating member movably mounted within the body and comprising spaced bars, and weights at the upper and lower ends of the bars and operating at opposite ends of the slips.

11. In a casing-spear, the combination of a body, and slips mounted thereon and having positive interlocking connection one with the other, said connection admitting of the slips having relative lateral movement without permitting their longitudinal displacement.

12. In a casing-spear, the combination of a body, slips mounted thereon and having a positive interlocking connection to prevent longitudinal displacement while admitting of relative lateral movement, and a spring connection between the slips.

13. In a casing-spear, the combination of a body, slips mounted thereon and having an interlocking connection to prevent longitudinal displacement, a spring-actuated device normally drawing the slips together, and means for actuating said slips.

14. In a casing-spear, the combination of a hollow body, slips mounted thereon and having portions extended transversely through said body and interlocked, an actuating-bar slidably mounted in the body for operating said slips, and a spring connection normally drawing the slips together.

15. In a casing-spear, the combination of a hollow body, slips mounted thereon and having portions extended transversely through the body and interlocked, a pin passed transversely through the interlocked portions of the slips, and springs mounted upon the end portions of said pin and coöperating therewith and with said slips to normally press the latter together.

16. In a casing-spear, the combination with the body and oppositely-disposed slips, and means coöperating with the slips to close the space formed between them to exclude entrance of foreign matter.

17. In a casing-spear, the combination of a body, oppositely-disposed slips having inwardly-extended web portions spaced apart when the spear is in operation, means closing the sides of the space formed between said web portions, and a strip extended over the webs of the slips to close the space formed between them for exclusion of foreign matter.

18. In a casing-spear, the combination of a body, coöperating slips, a hammer-bar for conjoint operation with said slips, said hammer-bar having a cross-bar and a funnel-shaped end, the latter provided with oppositely-inclined guides to give proper direction to a grapple when entering said funnel-shaped end to make positive connection with the cross-bar of the hammer-bar.

19. In a casing-spear, coöperating slips for sustaining the lifting pull, retaining or safety slips, and means actuated by the pulling-slips to move the retaining-slips in an opposite direction thereto to cause them to sustain the spear in the event of the pulling-pipe parting.

20. In a casing-spear, the combination of coöperating slips for sustaining the pulling force, means for setting said slips, retaining or safety slips, and means for positively transmitting motion from the pulling-slips to said safety slips in an opposite direction for setting the latter simultaneously with movement of the pulling-slips when thrown into operation.

21. In a casing-spear, the combination of a body, provided with oppositely-disposed inclines, oppositely-arranged sets of slips slidably mounted on said inclines, means for positively moving one set of slips, and intermediate connections for transmitting motion from the initially-moved slips to the other set of slips.

22. In a casing-spear, the combination of a body, oppositely-disposed slips, means for imparting movement to one set of slips, and connections for transmitting movement from the first to the second set of slips and embodying a yielding connection to admit of the two sets of slips having a varying movement.

23. In a casing-spear, the combination of oppositely-disposed slips, bars arranged to move in opposite directions, each of the bars having a portion extended into the path of corresponding slips of the different sets, and means between the bars for transmitting motion from one to the other in inverse direction.

24. In a casing-spear, the combination of a body, oppositely-disposed sets of slips, bars arranged to operate in reverse order and having portions extended into the path of corresponding slips of the different sets, a tappet yieldably connected with one of the bars to admit of the different slips having a varying movement, and means for transmitting motion from one bar to the other.

25. In combination, a body, oppositely-disposed sets of slips, toothed bars or racks mounted for reverse movement and having portions extended into the path of corresponding slips, a pinion for transmitting motion from one bar to the other, and a spring coöperating with said pinion.

26. In combination, a body provided with oppositely-inclined portions, slips mounted upon said inclined portions, oppositely-disposed toothed bars or racks, a spring-actuated pinion for transmitting motion from one toothed bar or rack to the other, and a tappet yieldably connected with one of the bars to admit of a variation in the movement of corresponding slips of the different sets.

In testimony whereof I affix my signature in presence of two witnesses.

FRANK N. DONALDSON. [L. S.]

Witnesses:
W. M. LUCAS,
J. C. McMANUS.